Nov. 3, 1953

S. S. HAYNES 2,657,969

PORTABLE RECORDER

Filed Dec. 2, 1949

INVENTOR.
STEPHEN S. HAYNES

BY Robert J. Peck

ATTORNEY

Nov. 3, 1953  S. S. HAYNES  2,657,969
PORTABLE RECORDER
Filed Dec. 2, 1949  2 Sheets-Sheet 2

INVENTOR.
STEPHEN S. HAYNES
BY Robert J. Peck
ATTORNEY

Patented Nov. 3, 1953

2,657,969

UNITED STATES PATENT OFFICE 2,657,969

PORTABLE RECORDER

Stephen S. Haynes, Towson, Md., assignor to Bendix Aviation Corporation, Baltimore, Md., a corporation of Delaware Application December 2, 1949, Serial No. 130,801

1 Claim. (Cl. 346—134)

This invention relates generally to portable recording instruments of the type having at least one condition responsive pen cooperating with a moving chart to record the value of the condition under observation and particularly to improvements of such a nature that permit low manufacturing cost, simplicity of operation, and a minimum of working parts.

An example of the type of instrument to which the present invention is ideally adapted is a so-called portable hygrothermograph in which humidity and temperature responsive elements are arranged to actuate corresponding recording pens, the pens cooperating with a moving chart to record the values of humidity and temperature over a predetermined interval of time. The entire assembly is housed within a portable carrying case, about the size of a camera, which can be conveniently carried in an overcoat pocket. The charts used with such an instrument are rectangular in shape and are conveniently designed for filing, being on the order of 3 x 5 inches. The chart derives its motion from a spring wound clock designed to give a maximum recording interval of thirty hours without re-winding of the spring.

The improvements covered by the present invention relate to the recording section of the instrument; namely, the chart-drive and the chart-carriage supporting and guiding arrangements.

It is desirable, in portable recording instruments, to provide for more than one recording interval and, to this end, suitable sets of gears have been provided with such instruments. For example, if two chart speeds are required, it is necessary to provide two sets of gears. Obviously, such an arrangement means that some provision must be made for storage of the alternate set of gears and consequently, space must be provided in the instrument for storage purposes. Furthermore, even with space provided for storage, it is quite possible for the alternate set of gears to be misplaced, which, of course, adds to the nuisance and inconvenience of handling several parts over a period of time.

Furthermore, it is desirable to have some means provided for quickly and easily moving the chart from its end point of travel to its initial position.

It is also desirable from the standpoint of compactness and ruggedness, to make the overall recording assembly as simple and compact as is possible, utilizing a minimum number of parts, utilizing all available space, and accomplishing the above at the minimum cost.

Accordingly, it is an object of the invention to provide, in a portable recording instrument, a novel two-speed driving mechanism, together with a novel arrangement for supporting the chart carriage, the entire assembly utilizing a minimum number of parts, making effective use of available space, and being adapted for low-cost manufacture.

Other objects and advantages will be apparent upon reference to the detailed specification following, when taken in conjunction with the drawings annexed hereto, in which.

Figure 1:
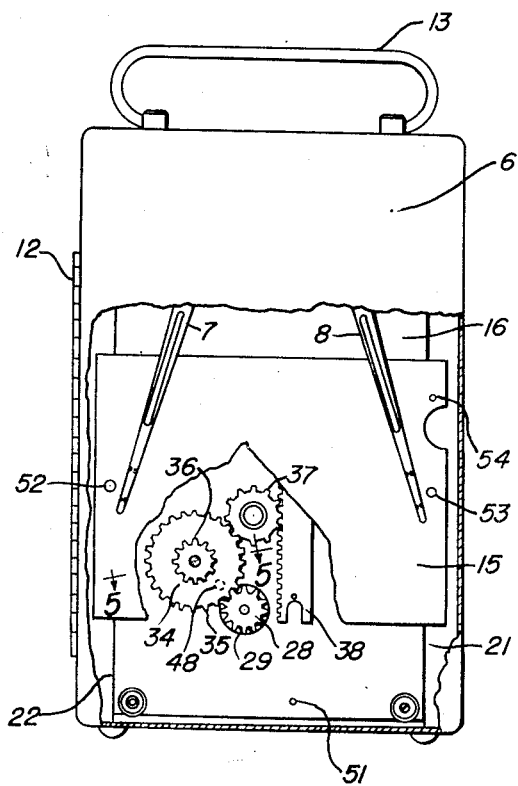
Fig. 1 is a front view, in elevation, of a portable recording instrument, wherein portions of the instrument have been cut away to show the novel two-speed driving mechanism.

Referring now to Fig. 1, we see a portable recording instrument 6 which, in this case, is a hygrothermograph having a pair of recording pens 7, 8, the pens moving in response to changes in ambient temperature and humidity, respectively. Suitable temperature and humidity responsive devices are mounted within the instrument 6, together with suitable mechanical linkage systems for actuating the pens 7, 8. The condition responsive devices and the linkage system form no part of the present invention and, for the sake of brevity and clarity, have not been shown in the drawings. The instrument 6 consists of a two-part casing having a front section 9 and a back section 11, the two sections being hinged together on one side as shown at 12, there being a suitable latch (not shown) on the side opposite the hinge for retaining the sections together. A suitable handle 13 is provided for conveniently carrying the instrument.

There is also a window 14 in the front section 9 to permit inspection of the chart without opening the instrument. The window 14 may be of the type shown in co-pending application Serial No. 115,544 filed September 13, 1949.

A carriage assembly 15 is provided for moving a chart (not shown) through a predetermined distance corresponding to a predetermined time interval, with respect to the recording pens 7, 8, so that a visual record of ambient temperature and humidity is produced.

Figure 2:
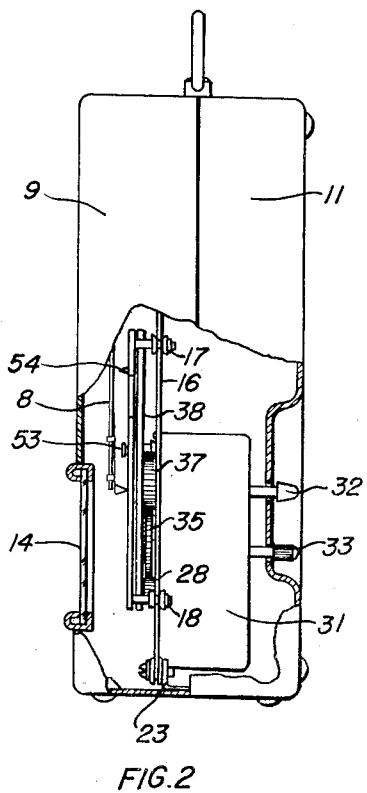
Fig. 2 is a side-view of the instrument shown in Fig. 1, there being a portion of the housing cut away.

The carriage 15 is mounted for movement along a vertical plate 16, the carriage being provided with a pair of flanged wheels 17, 18, and a third wheel 19, the wheels being adapted to roll along the edges 21 and 22, respectively, of the plate 16. The plate 16 is suitably supported within the instrument 6 by means of a pair of flanged members 23 (one of which is shown in Fig. 2), each one of the flanged members, in turn, being suitably secured to the upper and lower surfaces of the back section 11, respectively. The plate 16 may be secured to the flanged members 23 by means of suitable screws.

Wheels 17 and 18 are suitably mounted for rotation directly on carriage 15, whereas wheel 19 is carried on one end of a lever 24, pivotably mounted at 25 on the carriage 15, the other end of the lever 24 having one end of spring 26 affixed to pin 27, which, in turn, is siutably secured to the carriage 15. The spring 26 biases the lever 24 in a direction urging the wheel 19 in engagement with edge 22.

Figure 4:
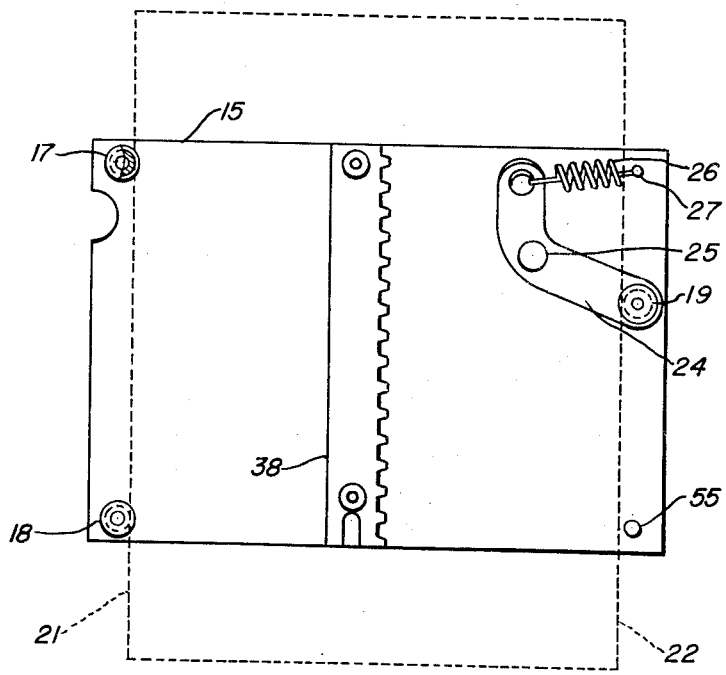
Fig. 4 is a back view of the carriage shown in Fig. 1, the supporting plate cooperating with the carriage being shown in phantom lines.

Each of the wheels 17, 18 and 19 is identically made and its manner of construction can be readily seen by reference to Fig. 4, wherein the wheel 17 is shown with portions of it cut away to illustrate the mode of construction. Referring specifically to Fig. 4, it is seen that the edge engaging portion has a flange affixed to each of its ends and the flanges serve to guide the wheel along the edge.

With the above-described arrangement, it is apparent that the carriage 15 can travel up and down on the plate 16 with a minimum amount of possible lateral motion. It is not necessary that the edges 21, 22, be absolutely parallel, nor is it necessary that the width of the plate 16 defined by these edges be held to close tolerances, as the resilient mounting of wheel 19 will compensate for minor deviations. An important advantage is derived from this arrangement in that manufacturing costs are materially reduced by eliminating the necessity of maintaining the edges 21, 22, in precise spaced parallel relationship. Another important advantage is also derived from the resilient mounting arrangement of the wheel 19, and this will be described later on.

A gear 28, extending through opening 29 in the plate 16, is driven by means of a conventional spring-wound clock motor generally indicated at 31 (see Fig. 2), secured within the back section 11 of the instrument 6 on the back side of the plate 16. The clock motor 31 has a winding stem 32 and a setting stem 33, the stems extending through the back face of the back section 11 for convenient manipulation. The gear 28 constitutes the driving gear.

An integral assembly 34 of a pair of gears 35, 36, is also journaled for rotation in the plate 16 and is adapted to engage with the gear 28. The integral gear assembly 34 is also adapted to engage the pinion 37, which is journaled for rotation in the plate 16, the pinion 37, in turn, engaging the rack 38, which is affixed to the rear face of the carriage assembly 15.

Thus it will be seen that the clock 31 drives the gear 28 and, by means of the integral gear assembly 34, the pinion 37 is driven; which, in turn, drives the rack 38 to move the carriage assembly 15 with respect to the recording pens 7, 8.

Figure 5:
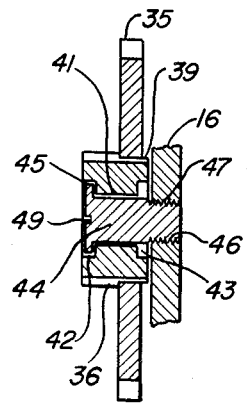
Fig. 5 is a partial sectional view along the lines 5—5 of Fig. 1.

The integral gear assembly constitutes one of the novel features of the invention and consists of the gears 35, 36, arranged concentrically about a common center, the two gears having different radii. Referring now to Fig. 5, we see that the gear 36 is in the form of a pinion having a suitable hub 39, which is adapted to be pressed into a centrally located aperture in the gear 35. Thus, the gears 35, 36, are rigidly secured together to comprise an integral gear assembly.

The gear 36 has an aperture 41 located centrally thereof and the aperture 41 is cut away at its extremities to form the annular shoulders 42, 43. A screw 44 having an enlarged head 45 extends through the aperture 41 with the head 45 nesting in the annular shoulder 42, and its threaded extremity 46 extending beyond the hub 39. A pair of threaded apertures 47, 48 (see Figs. 1 and 3) are provided in the plate 16 for selectively receiving the threaded extremity 46 of the screw 44. A slot 49 is provided in the head 45 so that the screw 44 can be conveniently assembled or disassembled by means of a screwdriver.

In the position of the assembly shown in Fig. 1, the gear 35 engages both the driving gear 28 and the pinion 37, whereby a direct drive is provided from the driving gear to the pinion, resulting in a slow speed of the carriage assembly 15. In this position of the parts, the gear 36 serves as an idler gear.

Figure 3:
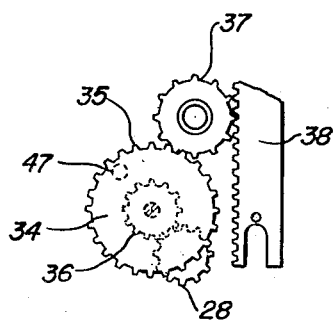
Fig. 3 is a somewhat exploded view of the novel two-speed gear assembly shown in Fig. 1, but with the parts arranged for a different driving speed.

If it is desired to move the carriage assembly 15 at high speed, it is only necessary to remove the screw 44 from the aperture 47 which, of course, permits the gear assembly 34 to be removed. To reassemble to the high-speed operation, the gear assembly 34 is merely turned over and the screw 44 is inserted through the aperture 41 in such a fashion that the head 45 nests in the shoulder 43. With the screw 44 and the gear assembly 34 in this position, the threaded extremity 46 of screw 44 is inserted into the threaded aperture 48 and the screw 44 is tightened in place. Such a position of the parts assembled for high-speed operation is shown in Fig. 3. In this position, the gear 36 engages the driving gear 28 and the gear 35 engages the pinion 37. It is to be noted (see Fig. 2) that the gear engaging surface of the pinion 37 is sufficiently wide to permit engagement of the pinion 37 with the gear 35 in both positions of the integral gear assembly 34. Again referring to Fig. 3, it is obvious that the gear 35 will now rotate faster than when in the position shown in Fig. 1, thus resulting in a higher speed drive for the carriage assembly 15.

From the above, it is evident that two speeds of operation are provided for the carriage assembly 15 by means of the novel assembly of the gears 35, 36. No spare or alternate sets of gears are required, which, of course, eliminates any need for storage space for such an alternate or spare set of gears, and permits a maximum use of the effective space within the housing of the instrument 6. All of the parts required for the two-speed operation are constantly in use and the mechanism can be readily adjusted for one speed or the other through the simple expedient of removing the screw 44, reversing the position of the gears 35, 56, and reinsertion of the screw 44 into the alternate apertures provided in the plate 16.

The design of the instrument shown is such that, when the parts are assembled as shown in Fig. 1, the carriage assembly 15 will move through a distance corresponding to an interval of thirty hours, whereas, with the parts assembled as shown in Fig. 3, the carriage assembly 15 will move through the same distance as before but the distance, in this case, will correspond to an interval of ten hours. Thus we have a three-to-one ratio of driving speeds for a constant speed clock motor. Suitable stop pins 51 are affixed to the plate 16 near its upper and lower extremities (only the lower pin showing in the drawings—see Fig. 1) for limiting the travel of the carriage 15 in a vertical direction. The bottom pin 51 is shown opposite the U-cutout in rack 38, so that the carriage 15 can move to the bottom of the instrument.

In operation, a chart is suitably secured to the carriage 15, by means of pins 52, 53, and the spike 54, and the carriage is positioned at its upper limit of travel. Each of the pins 52, 53, have an enlarged head and are adapted to cooperate with holes in the chart, each of the holes having a small slot extending therefrom, the width of which is substantially the same as the width of the pins 52, 53. Thus the chart can be positioned by matching the holes on the chart with the enlarged heads of the pins 52, 53, and then sliding the chart with respect to the pins so that the portion of the pins of reduced diameter finally engages the slot portions of the holes in the chart. The spike 54 extends from the face of the carriage 15 and pierces the chart to further secure same in place.

The gear assembly 34 is positioned as required, after which the clock 31 can be wound, and the instrument will then record continuously until the carriage assembly 15 reaches the lower limit of its travel. Again referring to the resilient mounting of wheel 19, it is apparent that the carriage 15 can be moved up or down, at will, for adjustment purposes, merely by pressing firmly on the edge of the carriage 15 adjacent the wheel 19. Such pressure permits transverse motion of the carriage 15 of sufficient magnitude to disengage rack 38 from pinion 37 and thus permit free vertical motion of the carriage. In this connection, the pin 27, together with stop pin 55, limits transverse motion of the carriage so that the flanges of the wheels 17, 18 do not project beyond the edge of the plate 16.

It is to be noted that disengagement of the rack 38 from the pinion 37 will permit adjustment of the vertical position of the carriage 15. However, this adjustment of the position is relatively coarse in that the width of the teeth of the rack 38 is a limiting factor. Fine adjustment of the position of the carriage 15 is achieved by means of the setting stem 33 of the clock 31. The coarse adjustment is quick and permits the carriage to be adjusted to the approximate position desired and the setting stem, which comprises a manual drive for the gear 28, permits the final position to be adjusted quite closely. Thus another important advantage is attained through the use of the resilient mounting of wheel 19, for, in the absence of such an arrangement, it would be necessary to resort solely to the setting stem 33 for positioning of the carriage 15. Obviously, such an arrangement would be laborious and time-consuming for any substantial range of adjustment of the carriage 15.

From the above, it will be seen that a two-speed recording mechanism is provided embodying a minimum number of parts, a reduction in space requirements, and minimum manufacturing costs—all these advantages being attained through no sacrifice in accuracy or precision.

What is claimed and desired to be secured by United States Letters Patent is:

In a portable recording instrument of the type having at least one condition responsive pen cooperating with a chart moving in a vertical direction to record the value of a condition under observation, in combination: a vertically extending main support plate having a pair of substantially parallel vertical edges, a carriage for supporting said chart, means affixed to said carriage and cooperating with said edges to permit said carriage to move with respect to said plate in a vertical direction, said last named means comprising a first pair of flanged wheels rotatably mounted on said carriage and engaging one of said edges and a third wheel rotatably mounted on said carriage and engaging the other of said edges, said third wheel being mounted on a lever arm, said lever arm being pivotally mounted on said carriage and biased in a direction urging said third wheel against said other edge, said third wheel being adapted for limited motion in a direction tranverse to said edges, and means for moving said carriage, comprising a rack affixed to said carriage, a pinion engaging said rack and rotatably mounted on said plate, a two-speed gear for driving said pinion, a clock-driven gear for driving said two-speed gear, a clock mechanism mounted on said main support plate and having its drive-shaft extending through an aperture in said support plate so that said clock-driven gear can be affixed thereto, said two-speed gear comprising a pair of integral gears having different radii arranged about a common center, and means for selectively mounting said two-speed gear for rotation about alternate axes in said plate whereby, in one position, the larger of said gear pair engages said pinion and said clock-driven gear and, in the other position, the larger of said gear pair engages said pinion and the smaller of said gear pair engages said clock-driven gear, said last named means comprising a pair of spaced threaded apertures in said plate, an axially located aperture in said two-speed gear, and a screw cooperating with said axial aperture to permit rotation of said two-speed gear, said screw selectively engaging either of said pair of apertures in said plate.

STEPHEN S. HAYNES.

References Cited in the file of this patent

UNITED STATES PATENTS

| Number | Name | Date |
|---|---|---|
| 442,925 | Tanner et al. | Dec. 16, 1890 |
| 1,069,594 | Wurmb et al. | Aug. 5, 1913 |
| 1,944,672 | Schaeffer | Jan. 23, 1934 |
| 2,033,177 | Borden | Mar. 10, 1936 |
| 2,181,867 | Cameron | Dec. 5, 1939 |
| 2,351,921 | Bullard | June 20, 1944 |
| 2,389,345 | Dell et al. | Nov. 20, 1946 |

FOREIGN PATENTS

| Number | Country | Date |
|---|---|---|
| 594,954 | Great Britain | Nov. 24, 1947 |